Feb. 24, 1948. N. STRAUSSLER 2,436,680
VALVE FOR CONTROLLING SUPPLY OF LIQUID UNDER PRESSURE
Filed Aug. 7, 1945 2 Sheets-Sheet 1
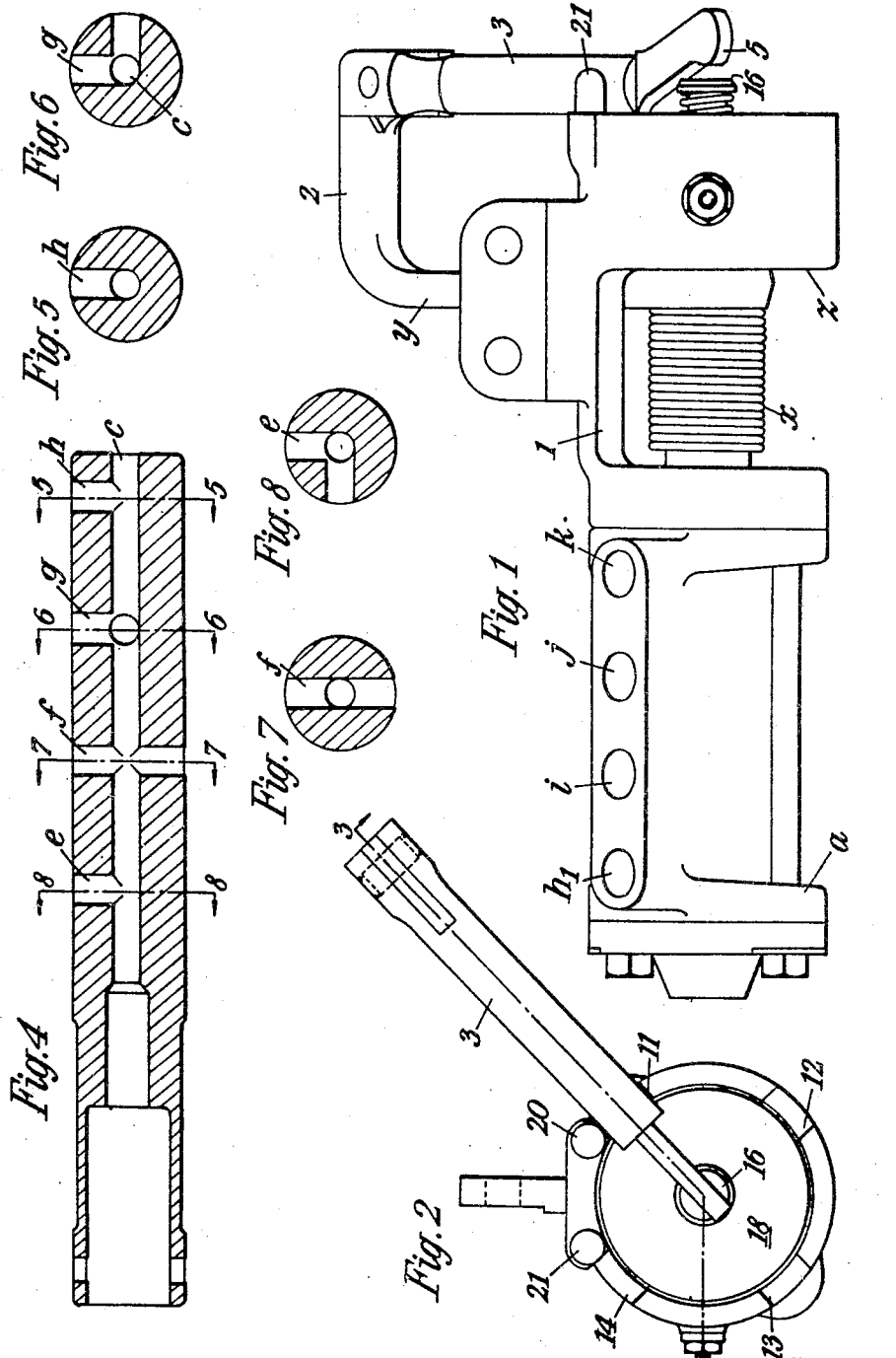
Inventor
Nicholas Straussler.
By Loyd Hall Sutton.
Attorney

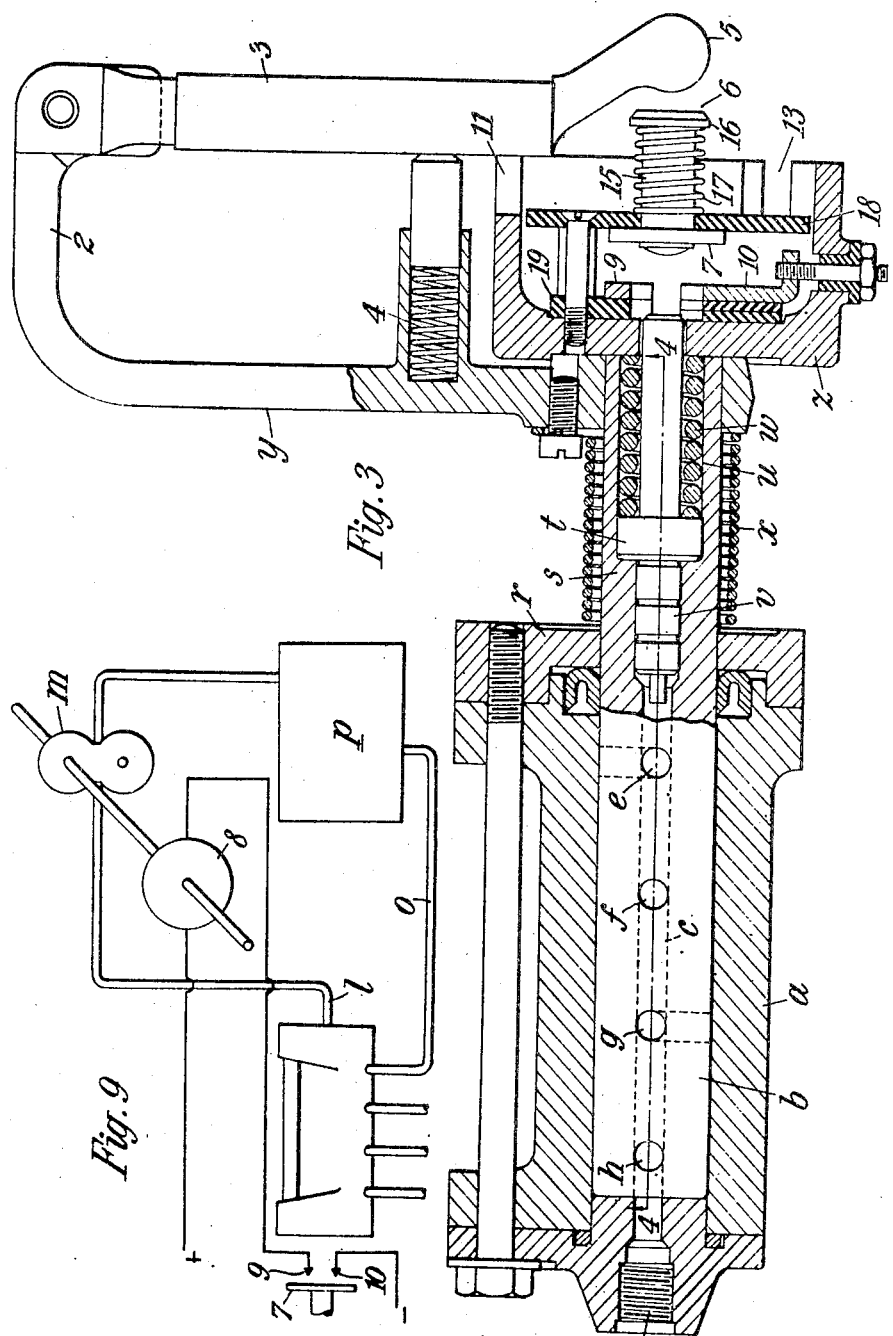

Patented Feb. 24, 1948

2,436,680

UNITED STATES PATENT OFFICE 2,436,680

VALVE FOR CONTROLLING SUPPLY OF LIQUID UNDER PRESSURE

Nicholas Straussler, London, England

Application August 7, 1945, Serial No. 609,361
In Great Britain December 3, 1943

Section 1, Public Law 690, August 8, 1946
Patent expires December 3, 1963

2 Claims. (Cl. 200—53)

1

This invention relates to valves for distributing supply of liquid under pressure, which can be moved to a plurality of positions whereby liquid under pressure is supplied.

The primary object of the invention is to provide a distribution valve so that fluid under pressure can be directed for actuating any one of a plurality of mechanisms. For example, as applied to an amphibious tank vehicle as described in specifications Serial Nos. 434,604 and 487,622, now Patents No. 2,390,747 and No. 2,398,057, respectively, movement of the valve to one position supplies liquid under pressure for raising the propeller to a second position supplies liquid under pressure for collapsing mechanical struts and to a third position supplies liquid under pressure to open exhaust valves of pneumatic struts.

According to the invention on movement of a valve to one of a plurality of positions, liquid under pressure is supplied for actuating one of a plurality of elements but when actuation of an element has been completed, the supply pressure operates means whereby the supply of liquid for actuating the element is discontinued.

The operating means for the valve preferably comprises a manually operable rotatably mounted handle for rotating a valve to any one of said positions against the action of resilient means and having a pivoted element adapted to be manually depressed against the action of resilient means, on grasping the handle, to close electrical contacts in a circuit of an electric motor which is coupled to a pump, the pressure side of which is connected to the valve casing and the suction side to a reservoir containing the liquid which may be oil or water.

Assuming that the valve has been moved to one of said positions, the operator is holding it in said position then after a predetermined pressure has been reached the liquid under pressure moves a piston against the action of a spring and moves the pivoted element about its pivotal axis whereby the contacts are separated, it being understood that this movement of the pivoted element will overcome the resistance of the operator's grasp of the handle.

Referring now to the accompanying drawings:

Figure 1 is a side elevation of a valve according to the invention,

Figure 2 is an end elevation looking towards the left of Figure 1,

Figure 3 is a sectional plan view taken on the line 3—3 of Figure 2,

Figure 4 is a sectional elevation of the valve taken on the line 4—4 of Figure 3,

2

Figures 5, 6, 7 and 8 are transverse sectional views of the valve respectively taken on the lines 5—5, 6—6, 7—7 and 8—8 of Figure 4, and Figure 9 is a diagram showing the connection.

In carrying out the invention according to one mode a cylindrical valve casing $a$ is provided having rotatably mounted therein a valve member $b$ having a central passage $c$ and provided with a series (in the present case four) of cylinder ports $e$, $f$, $g$, $h$. The casing is provided with a similar number of radial valve ports $h_1$, $i$, $j$, $k$ spaced longitudinally of the cylinder axis and in line axially. The central passage $c$ is connected to and interconnects all the ports in the valve and it will be seen from Figures 5 to 8 that port $e$, is a right angled port, port $f$ is a diametral port, port $g$ is a right angled port but with the horizontal limb terminating on the opposite side of the valve member to that of the port $e$ and port $h$ is a radial port. As will be seen from Figure 4, the vertical limb of the port $e$, the port $f$, the vertical limb of the port $g$ and the radial port $h$ are in line axially and when the parts are in the positions shown in Figures 1 to 3 they register respectively with the casing ports $k$, $j$, $i$, and $h_1$. Therefore, the radial port $h$, the other limb of the port $g$, the port $f$ and the other limb of the port $e$ are arranged at intervals of 90°.

The outer end of the central passage $c$ of the valve member is connected by a pipe $l$ to the pressure side of a liquid pump $m$ by way of a passage $n$ extending through the outer end cover of the valve casing and the casing ports $i$, $j$, $k$ are each connected by a pipe to a cylinder, for example, having therein a piston which is adapted to be actuated by liquid under pressure for operating one of the elements. The other casing port $h_1$ is connected by a pipe $o$ to a liquid reservoir $p$ which in turn is connected to the suction side of the pump. The inner end of the casing $a$ has a cover $r$ provided with a central opening through which projects a tubular extension $s$ of the valve member and within this extension of the valve member a piston $t$ is mounted which slides in a counterbore $u$ of said extension. The piston has a reduced part $v$ which slides in the interior of the valve. Within the counterbore there is also provided a spring $w$ which at one end bears on the piston and at the other end on a stationary gate member to be hereafter more fully described. The tubular extension of the valve member is surrounded by a coil spring $x$ connected at one end to the valve casing $a$ which is stationary and at the other end to the operating handle $y$ which is secured to the outer end of the extension $s$ of the valve member $b$ and bears against the inner face of the gate member $z$. The gate member $z$ is stationary being integrally connected with the cylinder cover $r$ by means of a bar $l$.

The rotatable operating hande $y$ at its outer end has an arm $2$ extending at right angles thereto and to this arm there is pivoted an auxiliary handle $3$, the main operating handle and the auxiliary handle forming an approximate U of such dimensions that the two limbs can be gripped by the hand and the limb $3$ moved toward the other limb against the action of a spring $4$. The inner end $5$ of the auxiliary handle is positioned to a sliding member $6$ carrying a bridge contact member $7$, the sliding member being disposed coaxially with the rotatable valve member, and arranged for movement along said axis against the action of a spring so that when the limb $3$ is fully depressed an electrical circuit is completed which supplies current to an electric motor which drives the pump $m$. The bridge contact $7$ at this time bridges the contacts $9$ and $10$. The auxiliary handle cannot however be depressed unless it is in one of four positions relative to the gate, that is to say, when the limb $3$ is in a position to enter one of four slots $11$, $12$, $13$, $14$ and the circuit cannot be completed during movement of the handle from slot to slot of the gate.

The contact $7$ is carried by a pin $15$ having a head $16$ against which one end of spring $17$ abuts, which bears at the other end against a plate of insulating material $18$ fixed to the gate. The contacts $9$ and $10$ are secured to a plate of insulating material $19$ also secured to the gate.

The handle, due to the action of the spring $x$ normally occupies a position with the part $3$ bearing against a fixed stop $20$, arranged so that the part $3$ will be in the same plane as the slot $11$ in the gate. Another stop $21$ limits movement of the handle against the action of the spring $x$ just referred to.

Upon grasping the operating handle and depressing the pivoted arm $3$ in the position in which it is shown in Figure 2 the contacts $9$ and $10$ will be bridged by contact $7$ to start the electric motor and the pumping of liquid but with the valve in this position liquid under pressure will flow through the central passage $c$ and port $h_1$ back to reservoir $p$ through pipe $o$.

However, when the operating handle is rotated from the position just referred to, to any one of the other three positions and the arm $3$ enters one of the slots $12$, $13$, or $14$, the valve will be rotated so that liquid will be pumped to effect operation of one of the three elements as above referred to. Further, when the operation of the element has been completed and pressure builds up in the central passage $c$, the piston $t$ will be forced to the right, Figure 3, against the action of its spring $w$ to move the arm $3$ about its pivot against the grasping action of the operator, whereby contacts $7$, $9$ and $10$ are separated so that the circuit of the electric motor is broken and the pumping of liquid ceases.

A characteristic of the valve is that an electrical switch for the purpose of controlling a motor for driving a fluid pressure pump cannot be closed so that current can pass to the motor whilst the valve member is being rotated. Thus the electrical circuit can only be completed when the valve member is stationary and in correct position for whichever fluid circuit has been selected.

A further characteristic is the means whereby the electrical circuit is broken when the fluid pressure rises above a predetermined degree, as when a particular element of operation has been performed.

Another characteristic is the provision of springs for returning the valve member and its handle to the initial or free position, and the arrangement of the fluid ports so that in this initial position the fluid lines from all the mechanical elements are open and so connect through the valve that the fluid therein can return to the reservoir or header tank at atmospheric pressure.

I claim:

1. A switch and valve unit comprising a casing, a valve rotatable in the casing, a fluid pressure supply port, distribution ports and a relief port in the casing, ports in the valve for establishing by rotation of the valve, to predetermined positions, connection of any one of said distribution ports to the fluid pressure supply port, spring means for returning the valve to a position in which the distribution ports are connected to said relief port, means for manually rotating the valve against the action of said spring means and an electric switch operable to close a circuit when the valve is at any one of said predetermined positions for initiating supply of fluid under pressure, the said switch being operated by an arm depressible relatively to said manually operable means, and the arm having associated therewith a gate permitting the arm to be depressed against the action of a spring for actuating the switch when the valve has been rotated to any one of said predetermined positions.

2. A switch and valve unit as claimed in claim 1, having fluid pressure operated means which acts, through a movable contact member of the switch, on the depressible member to move it against maintained depression by the operator when the pressure in the distribution port exceeds a predetermined amount.

NICHOLAS STRAUSSLER.

REFERENCES CITED

The following references are of record in the file of this patent:

UNITED STATES PATENTS

| Number | Name | Date |
| --- | --- | --- |
| 1,249,746 | Hall | Dec. 11, 1917 |
| 1,711,565 | Hatfield | May 7, 1929 |
| 1,762,066 | Mackey | June 3, 1930 |
| 2,263,784 | Peterson | Nov. 25, 1941 |
| 2,322,518 | Huber | June 22, 1943 |